United States Patent Office 3,036,956
Patented May 29, 1962

3,036,956
PROLONGED ACTION CORTICOTROPIN
PREPARATION
Robert E. Thompson, Momence, Ill., assignor, by mesne assignments, to Armour and Company, Chicago, Ill., a corporation of Delaware
No Drawing. Filed Aug. 15, 1958, Ser. No. 755,139
3 Claims. (Cl. 167—74)

This invention relates to a sustained or prolonged action corticotropin preparation and to processes for preparing the same.

This application is in part a continuation of my co-pending patent application Serial No. 639,628, filed February 12, 1957, now abandoned, which in turn is a continuation of my patent application Serial No. 222,531, filed April 23, 1951, now abandoned.

In the preparation of sustained effect or prolonged action corticotropin products, efforts have been made to provide an insoluble corticotropin preparation which, when introduced subcutaneously or intramuscularly, would be effective in feeding corticotropin into the blood stream and thence into the adrenal glands. One difficulty with such preparations is that they are relatively short-lived unless intolerable doses are employed. A further difficulty is that they do not uniformly feed the corticotropin material to the blood stream. Further, such preparations have been lacking in reliable stability.

The usual aqueous solutions of corticotropin hormone substances alone have, after injection, a rather short duration of action, and the effect tends to rise for a period of time to a peak and then to decrease to a point below the level of value desired. For example, most of the commonly studied hematological and metabolic changes brought about by the corticotropin hormone reach a maximum by the fourth hour after administration and have completely regressed by the eighth hour. In order to maintain an overall average level of the value desired, it is necessary to administer an amount of the hormone substance which will produce a maximum effect at the fourth hour, and at the time this maximum effect is produced, there is an excess of value about that desired. While the hormone substances may have an effect over an eight hour period, it is necessary to administer it in intervals of six hours or less in order to maintain the over-all level, and at the peak periods there is an excess of use of the activity and, therefore, a loss of the valuable substance. There is need for preparations which will reduce the effect during the so-called "peak periods" while maintaining a high level of the effect throughout the entire period of treatment.

An object of the present invention is to provide a corticotropin preparation which may be introduced subcutaneously or intramuscularly for the feeding of the corticotropin to the blood stream over an extremely long period. A further object is to provide such a preparation in which the corticotropin remains active and is fed evenly or uniformly over an extended period. Yet another object is to provide such a preparation which may be adjusted for feeding the active substance into the blood stream for selected periods, which may be a moderate period or a greatly extended period. A still further object is to provide a method of preparation of a corticotropinn in which the length of stimulation by the preparation is varied. A further object is to provide an adrenal gland-stimulating substance which remains stable under long storage conditions. Yet another object is to provide a corticotropin complex having an intense and prompt action when administered, while producing a relatively even stimulation of the adrenal glands over a long period of time while at the same time more nearly stimulating the natural feeding or secretion of the hormone by the pituitary. Other specific objects and advantages will appear as the specification proceeds.

In one aspect of this invention, there is provided a corticotropin preparation demonstrating prolonged action on subcutaneous or intramuscular administration which comprises an aqueous suspension including from 20 to 500 United States Pharmacopeia (U.S.P.) subcutaneous units per mil. of corticotropin, from 0.1 to 2.5 mg. of tannate per 100 U.S.P. subcutaneous units of corticotropin, at least 0.25 mg. of zinc per 100 U.S.P. subcutaneous units of corticotropin, and from 6 to 60 mg. of partially hydrolyzed gelatin per 100 U.S.P. subcutaneous units of corticotropin. Moreover, at least a portion of this aqueous suspension consists of a zinc-corticotropin-gelatin-tannate complex.

The terminology "U.S.P. subcutaneous units" refers to the subcutaneous corticotropin assay and unitage thereof set forth in the United States Pharmacopeia XV.

This corticotropin preparation is suitable for administration to animals and human beings by any route, but it will be understood that since the basis for the prolonged action thereof is the formation in the tissues of a depot, it is preferred that the administration thereof be parenterally by other than the intravenous route. Especially desirable prolonged corticotropin action is to be obtained when this preparation is administered subcutaneously or intramuscularly.

The corticotropin which may be employed in this corticotropin preparation includes both high and low potency substances, and the process set forth herein is applicable to the substances extracted from animal pituitary glands and to synthetic preparations of such active substances, both of which are referred to herein by the term "corticotropin." However, better results are to be obtained when the corticotropin included in this preparation is of high purity having a potency of at least 20 U.S.P. subcutaneous units per milligram. Especially desirable results can be achieved with corticotropin having a potency of at least 40 U.S.P. subcutaneous units per milligram. Also, although the corticotropin utilized in practicing this invention may be derived from pituitary glands of any animal species, better results are to be obtained with corticotropin derived from bovine and porcine pituitary tissue, and especially desirable is corticotropin derived from porcine pituitary glands.

As an example of the corticotropin, there may be included in this preparation a corticotropin such as is described in Lottie J. Walaszek, U.S. Patent 2,739,099.

Also, a desirable corticotropin preparation can be obtained by the well-known oxycellulose purification procedure along the lines suggested in I. M. Bunding U.S. Patent No. 2,669,536 in which purification is achieved by adsorption and elution on cellulose materials.

However, an especially desirable corticotropin for utilization in the practice of this invention may be obtained by my U.S. Patent No. 2,922,165.

Although the corticotropin may be included in this aqueous suspension at a concentration of from 20 to 500 U.S.P. subcutaneous units per cc., for practical purposes it is preferred to employ the corticotropin at a concentration of from 40 to 100 U.S.P. subcutaneous units per cc.

The tannate constituent of this corticotropin preparation may be derived from pharmaceutical grade tannic acid. Although the tannate may be included in this preparation at a concentration of from 0.1 to 2.5 mg. per 100 U.S.P. subcutaneous units of corticotropin, better results may be obtained at a concentration thereof from 0.2 to 1.0 mg. per 100 U.S.P. subcutaneous units of corticotropin, and especially desirable results are obtained with tannic acid at a concentration of about 0.4 mg. per 100 U.S.P. subcutaneous units of corticotropin.

The zinc constituent of this corticotropin preparation may be derived from any zinc salt, but it is preferred of course to employ a water-soluble zinc salt such as zinc acetate. Although the zinc may be included in this aqueous suspension at a concentration of at least 0.25 mg. per 100 U.S.P. subcutaneous units of corticotropin, for practical purposes, it is preferred to employ the zinc at a concentration of from 0.5 to 2.0 mg. per 100 U.S.P. subcutaneous units of corticotropin.

In the experiments leading to this invention, it was determined in tolerance tests with animals that a zinc-corticotropin-tannate complex appears to be susceptible to inactivation by the tissues. This tissue inactivation effect prevents the absorption of corticotropin into the blood stream from a depot formed in the tissues. Consequently, there is obtained a reduced rate of metering of corticotropin into the blood stream, and there may be produced a blood level below that at which the adrenal gland is responsive to exogenous corticotropin. Moreover, in many instances there may be no ostensible effect by the administered corticotropin on the adrenal gland, and there may be an apparent loss of corticotropin activity. Accordingly, it has been discovered that the inclusion in this complex of a partially hydrolyzed gelatin counteracts this tissue inactivation phenomenon. In addition, the amount of gelatin included in this complex may be regulated to vary the rate at which the corticotropin is metered into the blood stream, and consequently there may be adjusted within limits the duration of action of the corticotropin preparation. At the same time, there is obtained by the inclusion in this complex of gelatin an enhanced corticotropin activity without apparent effect on the duration of action of the composition. In addition, this gelatin component serves to enhance the stability not only of the composition but especially of the tannate constituent. Moreover, the gelatin constituent serves to reduce any local irritation which might otherwise be observed with the complex.

The gelatin constituent of this corticotropin preparation should be of pharmaceutical grade and non-antigenic. The partial hydrolysis of the gelatin may be obtained by autoclaving a suitable gelatin solution at a pressure of about 15 p.s.i.g. for a period of about 8 hours.

Although the gelatin may be included in this composition at a concentration of from 2 to 60 mg. per 100 U.S.P. subcutaneous units of corticotropin, better results are obtained at a concentration thereof from 6 to 20 mg. per 100 U.S.P. subcutaneous units of corticotropin, and especially desirable results are provided with about 15 mg. of gelatin per 100 U.S.P. subcutaneous units of corticotropin.

It is possible to vary over a considerable range the duration of action obtained with this corticotropin preparation by adjusting the concentrations in the complex of the zinc and tannate components, as well as the hereinbefore described variation of the gelatin component.

It is desirable for the corticotropin preparation of this invention to demonstrate a pH of from 4 to 8, and it is preferred that the aqueous suspension have a pH of about 5.

It is indicated hereinbefore that at least a portion of the four principal ingredients included in this aqueous suspension, namely zinc, corticotropin, tannate and gelatin, should be in the form of a water-insoluble complex. By "aqueous suspension" is meant that this corticotropin preparation shall include a solid phase and a liquid (aqueous) phase wherein the solid phase is dispersible in the aqueous phase. Further, there is meant by the term "water-insoluble complex" that the solid phase includes at least a portion of the four principal ingredients in physical or chemical combination such that the complex is separable as an entity from the liquid phase. It will also be understood that a portion of any of the principal ingredients may be included in this corticotropin preparation as a constiuent of the liquid phase, and in some instances it may be desirable to provide corticotropin in this composition in both soluble and insoluble form such that there is demonstrable both in immediate and a prolonged corticotropin effect.

It will be apparent that the formation of this coricotropin preparation, and especially the production of this water-insoluble complex, generally involves a mixing of the principal ingredients in an aqueous medium until the combination of at least a portion of such ingredients has been obtained. Consequently, it can be appreciated that the starting material will usually be an aqueous solution containing the desired concentration of corticotropin. However, it has been found that the sequence in which the remaining ingredients are combined with this aqueous corticotropin solution may be varied to alter the characteristics of the resulting product. On the one hand, if this aqueous corticotropin solution is first combined with tannic acid, the subsequent addition thereto of the zinc constituent can be achieved within a relatively wide pH range. On the other hand, when the aqueous corticotropin solution is first combined with the zinc salt, the subsequent addition thereto of tannic acid should be obtained at an alkaline pH of about 7.4. It is desirable to add the gelatin constituent last, but it may be mixed first with the corticotropin. Amounts of zinc and tannic acid added may vary depending on the order of adding ACTH, gelatin and other stabilizers or preservatives.

Certain further ingredients may be included in this corticotropin preparation, especially for the purpose of enhancing the stability and shelf life thereof. For example, cysteine serves to stabilize all of the principal ingredients of this composition. Firstly, there is provided by cysteine an insolubilization of any soluble zinc in the preparation, thereby reducing local irritation which may be produced by the zinc ion. In addition, cysteine appears to retard chemical changes in the tannic acid, ACTH and gelatin constituents of this composition. Also, the cysteine apparently combines with this water-insoluble complex to remain at the site of injection and may exert its anti-oxidative properties in the tissues. The cysteine may be included in this aqueous suspension at a concentration of from 0.2 to 2.0 mg. per 100 U.S.P. subcataneous units of corticotropin. However, better results can be achieved at a cysteine concentration of about 1 mg. per 100 U.S.P. subcutaneous units of corticotropin.

Further, there may be combined with this corticotropin preparation, especially when there is intended a multiple injection product, such antibacterial agents as methyl and propyl paraminobenzoate. Satisfactory results have been achieved by employing the methyl paraminobenzoate at a concentration of about 0.1 to 0.2% (weight/volume), while the propyl paraminobenzoate may be included in this aqueous suspension at a concentration of about 0.01 to 0.02% (weight/volume). Phenol may also be used.

This invention can be further illustrated by the following specific examples:

*Example I*

500 mg. oxycel purified bovine corticotropin substance was mixed with 50 ml. water. 1.0% thiourea was added and the pH was adjusted to 6.5 with 20% sodium hydroxide solution. The mixture was placed in a glass bottle and sealed. The container and contents were placed in a hot air oven at 100±5° C. for six hours. After removal from the oven, the liquid was cooled to about 30° C. and filtered through a medium sintered glass filter. The precipitate was washed with water to bring the volume of filtrate to 50 ml. To 50 ml. of the corticotropin solution above was added 12 ml. of a 5.0% solution of crystalline zinc acetate. The pH was adjusted to 7.5 with 3% solution of sodium hydroxide and the mixture was allowed to stand for one-half hour. The mixture was centrifuged and the supernatant discarded. The precipitate containing the corticotropin was resuspended in 50 ml. of water containing 2.0 gms. of partially hydrolyzed gelatin. To the resulting suspension was added 24 ml. of a 1% solution of tannic acid. Then the pH of the solution was readjusted to 6.0 with a 3% sodium hydroxide solution. 24 ml. of 1.0% cysteine was added and the pH readjusted to 6.0. 2 ml. of glycerine, 0.6 gm. phenol and water were added to make 120 ml. at pH 6.1. The suspension was well mixed and filled 2.2 ml. per vial. Air in the vials was displaced with nitrogen and the vials were stoppered and sealed. Sterilization was effected by autoclaving at 116 to 121° C. for 15 minutes.

The finished product tested sterile by U.S.P. method and the potency was determined by the U.S.P. subcutaneous assay method to be 104.0±8.4 units per ml., indicating no potency loss after autoclaving. The physical character was excellent. This product was shown to produce adrenal stimulation for a period in excess of 96 hours after a single injection.

Example II 500 mg. oxycel purified bovine corticotropin substance was mixed with 25 ml. water. 0.25% pyridoxine hydrochloride was added and the pH adjusted to 4.7 with sodium hydroxide. This mixture was heated to 95–100° C. for 4¼ hours and then cooled and diluted to 70 ml. with water. The pH was adjusted to 6.5 with sodium hydroxide and the preparation then filtered to remove the pH 6.5 insoluble material. 560 mg. crystalline zinc acetate was added to the filtrate and the pH adjusted to 7.5 with 3% sodium hydroxide solution. The mixture was centrifuged and the supernatant discarded. The zinc-corticotropin precipitate was resuspended in 70 ml. of water containing 2.5 gms. of partially hydrolyzed gelatin. 11.2 ml. of a 0.5% solution of tannic acid was added, followed by 14 ml. of 2.0% solution of L-cysteine and 30 ml. of water containing 0.7 gm. phenol and 2.5 ml. glycerine The pH was adjusted to 6.0 with sodium hydroxide. The suspension was filled 2.3 ml. per vial, stoppered and sealed, and then autoclaved with 15 p.s.i. steam (116–121° C.) for 15 minutes.

The finished product tested sterile. Potency assayed by the U.S.P. subcutaneous assay procedure gave a value of 97.5±9.2 units per ml. This product caused strong adrenal stimulation for approximately 48 hours after a single injection of 0.1 subcutaneously to rats or after 100 and 200 unit doses to humans.

Example III

Crude ACTH was prepared by the hydrochloric acid-acetone extraction procedure from porcine pituitary glands. The crude ACTH was subjected to the oxycel adsorption process. 400 mg. of the oxycel-purified ACTH was mixed with water and pyridoxine hydrochloride at pH 4.7 and heated at 95–100° C. for 5 hours. After cooling to about 50° C., it was filtered to remove insoluble, inactive material. The precipitate was washed with water to bring the total volume of the filtrate to 40 ml. This was sterile filtered through an 02 Selas candle. To the filtrate was added through the candle 128 mg. tannic acid in 25 ml. water. Then 1.056 gm. crystalline zinc acetate and 9.6 grams of partially hydrolyzed gelatin each in 25 ml. of water, was added separately also through the sterile candle. Then was added by sterile filtration 200 ml. warm water containing 640 mg. cysteine, 600 mg. methyl paraben and 60 mg. propyl paraben. 10 ml. water was added after each filtration above to wash previous ingredients from candle. Finished volume of the sterile suspension was 320 ml. The suspension was filled aceptically 2.5 ml. into 6 ml. wide-mouthed vials and the vials were aseptically stoppered. The vials were then frozen and dried under vacuum and then sealed aseptically with conventional aluminum seals.

The finished product tested sterile. Addition of 1.0 to 5.0 ml. water or saline produced an excellent, uniform suspension of the insoluble ACTH complex. Potency assayed 234±19 units per vial by the U.S.P. subcutaneous procedure. The finished product reconstituted with saline was found to cause continuous adrenal stimulations for 48 to 72 hours after a single injection. Local tolerance was excellent.

Example IV

The product was prepared as in Example III. At the time of adding the cysteine and methyl and propyl paraben, gelatin was also added—6.25 ml. of a 32% aqueous solution of gelatin, previously autoclaved at 120° C. for 4–8 hours. This quantity of gelatin provided about 6 mg. of partially hydrolyzed gelatin per ml. in the finished product.

After lyophilization, this product reconstituted excellently and was found to exhibit stronger adrenal stimulation after injection than the product prepared as in Example III. There was no apparent change in duration of effectiveness.

Example V

Crude ACTH was prepared by the hydrochloric acid-acetone extraction procedure from porcine pituitary glands. The crude ACTH was subjected to the oxycel adsorption process. 400 mg. of the oxycel-purified ACTH was mixed with water and pyridoxine hydrochloride at pH 4.7 and heated at 95–100° C. for 5 hours. After cooling to about 50° C., it was filtered to remove insoluble, inactive material. The precipitate was washed with water to bring the total volume of the filtrate to 40 ml. This was sterile filtered through an 02 Selas candle. To the filtrate was added through the candle 256 mg. tannic acid in 25 ml. water to provide 0.8 mg. tannic acid per ml. of final product. Then 1.056 gm. crystalline zinc acetate and 9.6 gms. of partially hydrolyzed gelatin, each in 25 ml. of water, was added separately also through the sterile candle. Then was added by sterile filtration 200 ml. warm water containing 640 mg. cysteine, 600 mg. methyl paraben and 60 mg. propyl paraben. 10 ml. water was added after each filtration above to wash previous ingredients from candle. Finished volume of the sterile suspension was 320 ml. The suspension was filled aseptically 2.5 ml. into 6 ml. wide-mouth vials and the vials were aseptically stoppered. The vials were then frozen and dried under vacuum and then sealed aseptically with conventional aluminum seals.

This product was found to produce adrenal stimulation in excess of 96 hours after subcutaneous administration of a single dose.

Example VI

Crude ACTH was prepared by the hydrochloric acid-acetone extraction procedure from porcine pituitary glands. The crude ACTH was subjected to the oxycel adsorption process. 400 mg. of the oxycel-purified ACTH was mixed with water and pyridoxine hydrochloride at pH 4.7 and heated at 95–100° C. for 5 hours. After cooling to about 50° C., it was filtered to remove insoluble, inactive material. The precipitate was washed with water to bring the total volume of the filtrate to 40 ml. This was sterile filtered through an 02 Selas candle. To the filtrate was added through the candle 128 mg. tannic acid in 25 ml. water. Then 0.528 gm. crystalline zinc acetate and 9.6 gms. of partially hydrolyzed gelatin each in 25 ml. of water, was added, also through the sterile candle. This provided 0.5 mg. zinc per ml. of final product. Then was added by sterile filtration 200 ml. warm water containing 640 mg. cysteine, 600 mg. methyl paraben and 60 mg. propyl paraben. 10 ml. water was added after each filtration above to wash previous ingredients from candle. Finished volume of the sterile suspension was 320 ml. The suspension was filled aseptically 2.5 ml. into 6 ml. wide-mouthed vials and the vials were aseptically stoppered. The vials were then frozen and dried under vacuum and then sealed aseptically with conventional aluminum seals.

This product was found to act for about 48 hours with equal or superior intensity of response as compared with the product containing 1.0 mg. of zinc per ml. of final product as prepared in Example III.

Example VII

Crude ACTH was prepared by the hydrochloric acid-acetone extraction procedure from porcine pituitary glands. The crude ACTH was subjected to the oxycel adsorption process. 400 mg. of the oxycel-purified ACTH was mixed with water and pyridoxine hydrochloride at pH 4.7 and heated at 95–100° C. for 5 hours. After cooling to about 50° C., it was filtered to remove insoluble, inactive material. The precipitate was washed with water to bring the total volume of the filtrate to 40 ml. This was sterile filtered through an 02 Selas candle. To the filtrate was added through the candle 128 mg. tannic acid in 25 ml. water. Then was added an amount of aluminum chloride to provide 1.0 mg. of aluminum ion per ml. of finished product. Also, there was added partially hydrolyzed gelatin in an amount such that there was obtained in the resulting suspension 8 mg. of gelatin per 100 U.S.P. subcutaneous units of corticotropin. The pH was adjusted to 5.0 with sodium hydroxide. Then was added by sterile filtration 200 ml. warm water containing 640 mg. cysteine, 600 mg. methyl paraben and 60 mg. propyl paraben. 10 ml. water was added after each filtration above to wash previous ingredients from candle. Finished volume of the sterile suspension was 320 ml. The suspension was filled aseptically 2.5 ml. into 6 ml. wide-mouthed vials and the vials were aseptically stoppered. The vials were then frozen and dried under vacuum and then sealed aseptically with conventional aluminum seals.

Example VIII

An aqueous solution of porcine ACTH, in the amount of 40 cc., containing 640 units per cc. of ACTH was filtered through a Selas candle into a sterile container. An aqueous solution, in the amount of 25 cc., containing 120 mg. of tannic acid, was also filtered into the sterile container.

Thereafter, 1.056 gms. of zinc acetate, in 25 cc. of water, was filtered into the sterile container. The Selas candle was washed after each filtration with 10 cc. of water.

Then, an aqueous solution having the following composition was filtered through the Selas candle into the sterile container:

| | |
|---|---|
| Cysteine _____ mg__ | 320 |
| Methyl paraben _____ mg__ | 600 |
| Propyl paraben _____ mg__ | 60 |
| An aqueous solution containing 32% of gelatin hydrolyzed by autoclaving for a period of 8 hours _____ cc__ | 6.25 |
| Water _____ cc__ | 95 |

Water was filtered into the sterile container in such amount as to provide a final volume therein of 320 cc.

The resulting liquid suspension was filled into 6 cc. vials, 2.5 mm. per vial. The filled vials were subjected to lyophilization.

Upon analysis, there was determined to be 233 units of ACTH activity per vial. This product demonstrated a greater ACTH activity clinically, than a comparable product without gelatin.

Also, the product demonstrated a duration of action of about 48 hours.

This product was found to demonstrate, clinically, a duration of action of about 72 hours.

Example IX

The product was obtained by the method of Example II, except that ACTH having a potency of about 150 units per mg. was substituted for that having a potency of about 75 units per mg. described therein. Consequently, the resulting product contained twice the ACTH activity as that described in Example II.

It has been found that the relative amounts of zinc, tannic acid and ACTH in the foregoing formulae can be varied to achieve adsorption control for periods of from 1 day to about 6 days or more.

While in the foregoing specification various embodiments of this invention have been described in considerable detail for the purpose of illustration, it will be apparent to those skilled in the art that this invention is susceptible to other embodiments and that many of these details can be varied widely without departing from the basic concept and spirit of the invention.

I claim:

1. A prolonged action corticotropin preparation, comprising an aqueous suspension of from 20 to 500 U.S.P. subcutaneous units per ml. of corticotropin, from 0.1 to 2.5 mg. of tannate per 100 U.S.P. subcutaneous units of corticotropin, at least 0.25 mg. of zinc per 100 U.S.P. subcutaneous units of corticotropin, and from 6 to 60 mg. of partially hydrolyzed gelatin per 100 U.S.P. subcutaneous units of corticotropin, at least a portion of such ingredients being in the form of a water-insoluble zinc-corticotropin-gelatin-tannate complex.

2. A prolonged action corticotropin preparation, comprising an aqueous suspension of from 20 to 500 U.S.P. subcutaneous units per ml. of corticotropin, from 0.1 to 2.5 mg. of tannate per 100 U.S.P. subcutaneous units of corticotropin, from 0.5 to 2.0 mg. of zinc per 100 U.S.P. subcutaneous units of corticotropin, and from 6 to 60 mg. of partially hydrolyzed gelatin per 100 U.S.P. subcutaneous units of corticotropin, at least a portion of which ingredients are in the form of a water-insoluble zinc-corticotropin-gelatin-tannate complex.

3. A prolonged action corticotropin preparation, comprising an aqueous suspension of from 20 to 500 subcutaneous units per ml. of porcine corticotropin, from 0.1 to 2.5 mg. of tannate per 100 U.S.P. subcutaneous units of corticotropin, from 0.5 to 2.0 mg. of zinc per 100 U.S.P. subcutaneous units of corticotropin, from 6 to 60 mg. of partially hydrolyzed gelatin per 100 U.S.P. subcutaneous units of corticotropin, and from 0.2 to 2.0 mg. of cysteine per 100 U.S.P. subcutaneous units of corticotropin, at least a portion of which porcine corticotropin, zinc, gelatin, and tannate are in the form of a water-insoluble complex.

References Cited in the file of this patent

UNITED STATES PATENTS

| | | |
|---|---|---|
| 2,669,537 | Thompson | Feb. 16, 1954 |
| 2,807,569 | Homan | Sept. 24, 1957 |

OTHER REFERENCES

Proceedings of the Second Clinical ACTH Conference (Mote, Editor), 1951, pp. 2 and 3.